US005304306A

United States Patent [19]

Gerteis

[11] Patent Number: 5,304,306

[45] Date of Patent: Apr. 19, 1994

[54] REVERSE FILTER CENTRIFUGE

[75] Inventor: Hans Gerteis, Bietigheim-Bissingen, Fed. Rep. of Germany

[73] Assignee: Heinkel Industriezentrifugen GmbH & Co., Bietigheim-Bissingen, Fed. Rep. of Germany

[21] Appl. No.: 987,261

[22] PCT Filed: Sep. 24, 1990

[86] PCT No.: PCT/EP90/01617

§ 371 Date: Feb. 25, 1993

§ 102(e) Date: Feb. 25, 1993

[87] PCT Pub. No.: WO92/04982

PCT Pub. Date: Apr. 2, 1992

[51] Int. Cl.$^5$ ........ B01D 33/067

[52] U.S. Cl. ........ 210/380.3; 210/232; 210/373; 210/416.1; 494/23; 494/25; 494/26; 494/38; 494/41; 494/83

[58] Field of Search ........ 210/232, 236, 370, 380.1, 210/365, 367, 408, 380.3, 373, 416.1; 494/41, 83, 38, 26, 39, 45, 23, 25

[56] References Cited

U.S. PATENT DOCUMENTS

| | | | |
|---|---|---|---|
| 5,004,540 | 4/1991 | Hendricks | 210/232 |
| 5,092,995 | 3/1992 | Gerteis | 210/232 |
| 5,169,525 | 12/1992 | Gerteis | 210/232 |

*Primary Examiner*—Robert A. Dawson
*Assistant Examiner*—David Reifsnyder
*Attorney, Agent, or Firm*—Shenier & O'Connor

[57] ABSTRACT

A reverse filter centrifugal machine has a self-contained, rotatably mounted basket (7) in a housing (1), provided with radial filtrate passages (11) and capable of receiving an overpressure or a negative pressure, as well as a lid (19) that closes the free front side of the basket. The basket and the lid are axially movable with respect to one another. A feed opening for the suspension to be filtered is arranged in the lid and a feed pipe (21) is sealingly inserted through the feed opening. The feed pipe (21) is rotatably mounted around its longitudinal axis and can be rotated together with the basket (7) around this axis.

10 Claims, 2 Drawing Sheets

REVERSE FILTER CENTRIFUGE

Figure 1:
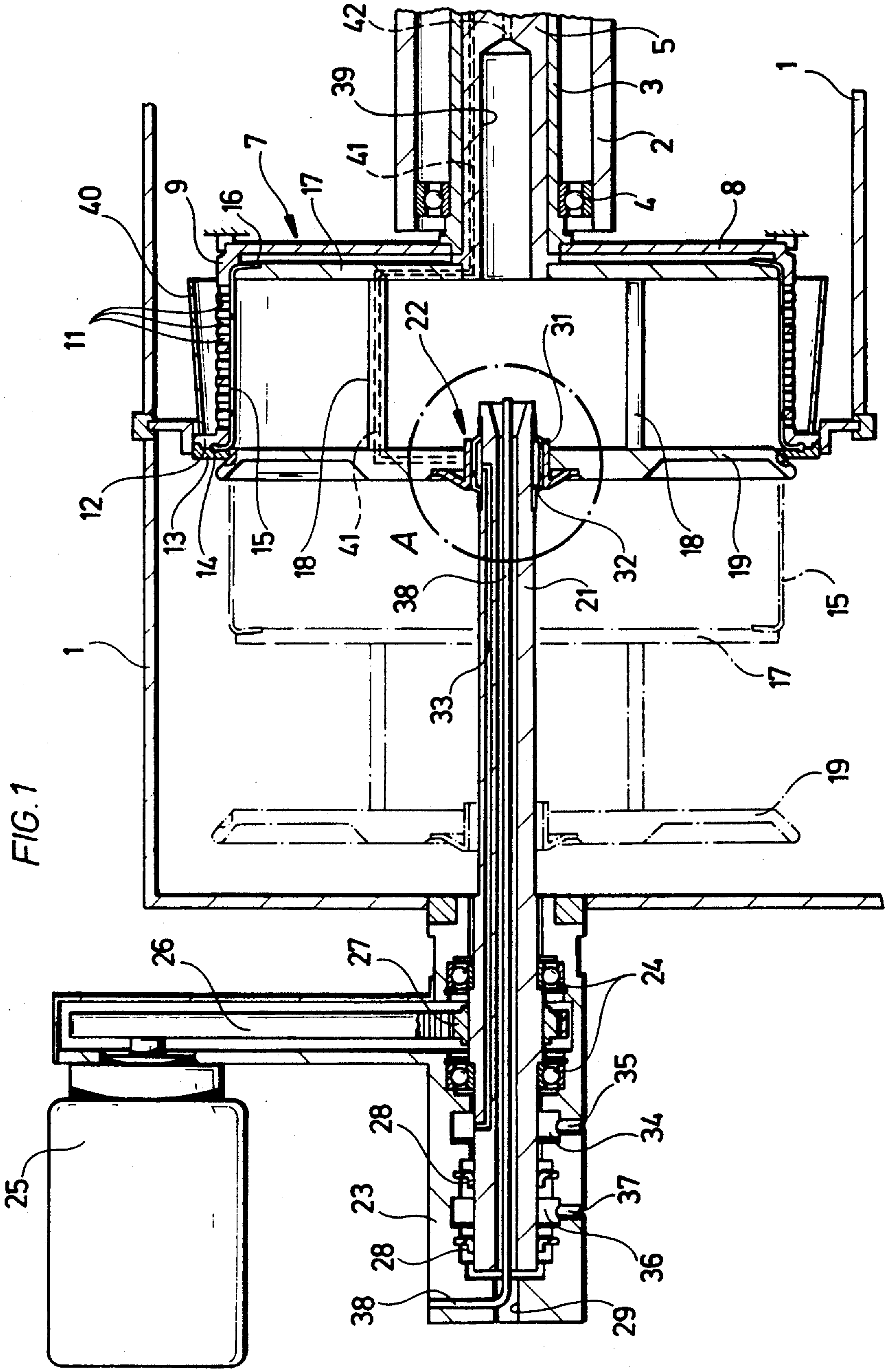

The invention relates to an invertible filter centrifuge comprising a self-supporting drum rotatably mounted in a housing, this drum having radial filtrate passages and being capable of receiving an overpressure or underpressure, a lid closing the free front side of the drum, said drum and lid being axially movable relative to one another, a feed opening for the suspension to be filtered arranged in the lid and a feed pipe sealingly inserted through the feed opening.

In a known invertible filter centrifuge of this type (DE 37 40 411 A1), a combined rotating and slide seal is arranged between the stationary feed pipe and the feed opening of the lid, allowing pressure or underpressure operation in the drum. The combined rotating and slide seal arranged directly in the feed opening of the lid has the disadvantage that due to the unavoidable rubbing sealing elements, severe abrasion in the region of the drum results, which can easily lead to undesirable soiling of the filtered product. Seeing that the drum rotates at a very high number of revolutions during the filtration process, severe abrasion results which gives rise to considerable soiling.

The object of the invention is to improve an invertible filter centrifuge of the generic type such that a combined rotating and slide seal causing abrasion in the region of the feed opening of the drum can be omitted.

The object is accomplished in accordance with the invention in that the feed pipe is rotatably mounted around its longitudinal axis and can be caused to rotate together with the drum around this axis.

Seeing that feed pipe and drum rotate synchronously according to the general inventive concept, the feed opening in the drum lid, through which the feed pipe is inserted, merely needs to be provided with a simple seal without rubbing sealing elements. Hereby, the soiling tendency of the abrasion is completely avoided.

The following description of preferred embodiments of the invention serves to explain the invention in greater detail in conjunction with the attached drawings.

Figure 2:
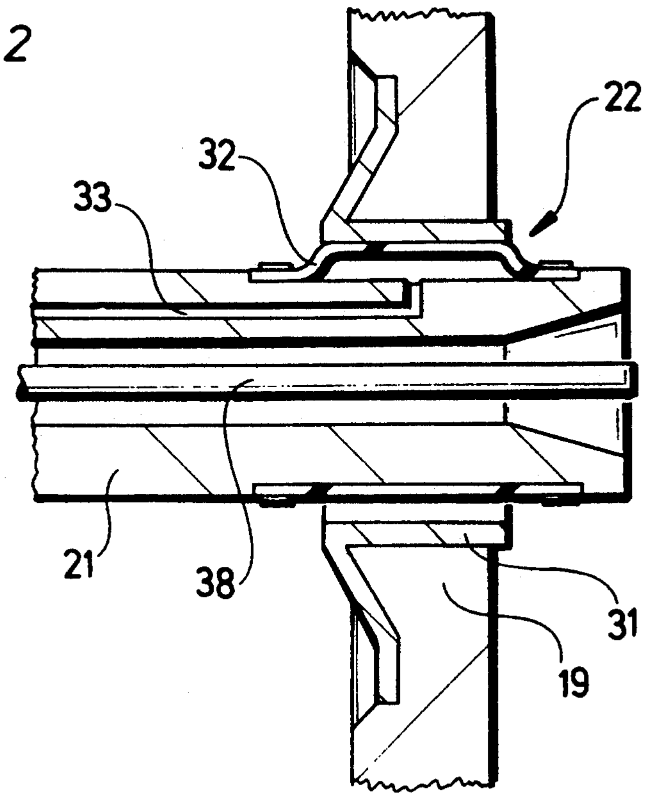

In the drawings:

FIG. 1: is a schematic part-sectioned view of an invertible filter centrifuge;

FIG. 2: is an enlarged detail view in the region A of FIG. 1 and

Figure 3:
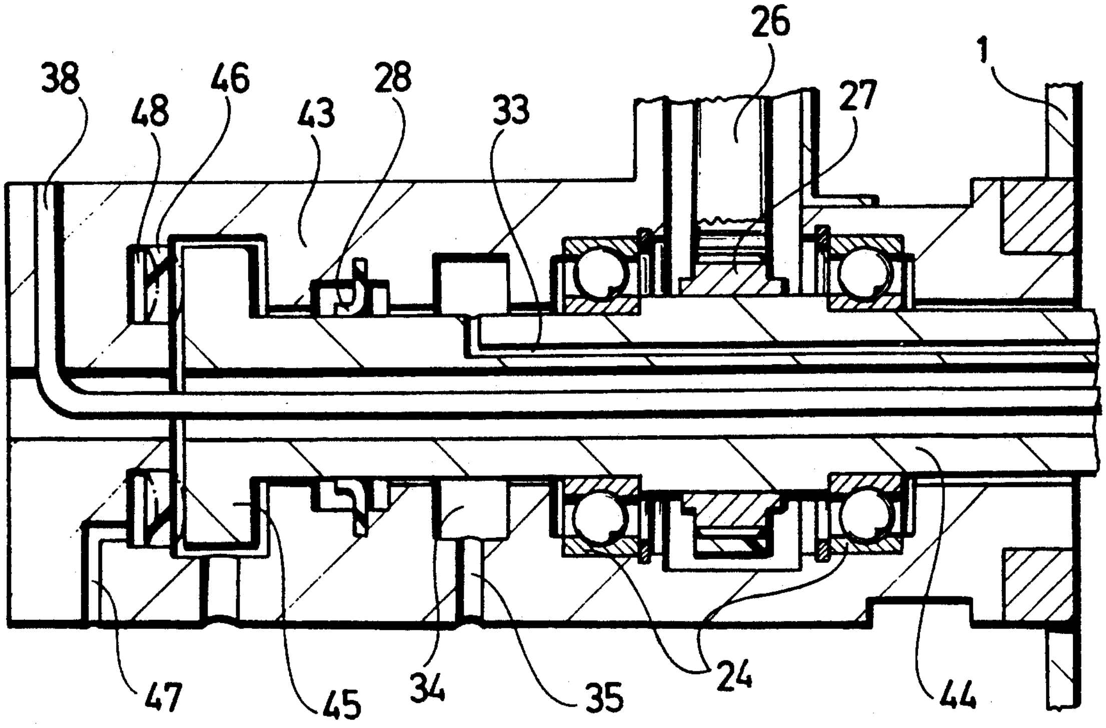

FIG. 3: is a schematic and enlarged part-sectioned view of an embodiment of an invertible filter centrifuge modified in comparison with FIG. 1.

The invertible filter centrifuge schematically illustrated in FIG. 1 comprises a housing 1 which sealingly encloses the entire machine, and in which a hollow shaft 3 is rotatably mounted in bearings 4 on a stationary machine frame 2. The end (not illustrated) of the hollow shaft 3 situated on the right of FIG. 1 and protruding beyond a corresponding bearing 4, is connected with a drive motor (also not illustrated), via which the hollow shaft 3 is caused to rotate quickly.

On the inside of the hollow shaft 3 an axially movable shaft 5 is arranged which is non-rotatably joined to the hollow shaft 3. The shaft 5, therefore, rotates together with the hollow shaft 3, but is, however, still axially movable inside the hollow shaft.

At the end of the hollow shaft 3, to the left of FIG. 1, protruding beyond the bearing 4 is a self-supporting and non-rotatable, cup-shaped centrifugal drum 7 which is flange connected to its base 8. The drum 7 has radially extending discharge openings 11 in its circular-cylindrical side wall 9. The drum 7 is open on its front side, opposite to its base 8. The flange-like edge 12 of the opening, surrounding this open front side, is sealingly clamped at one edge 14 of an essentially tube-like designed filter cloth 15 by means of a holding ring 13. The other edge 16 of the filter cloth 15 is sealingly connected with a base plate 17 in the corresponding way, this plate being rigidly connected to the moveable shaft freely penetrating the base 8. The filter cloth 15 covers the filtrate passages formed by the discharge openings 11.

Rigidly attached to the base plate 17 via rigid spacer bolts 18, leaving an intermediate space free, is a centrifugal chamber lid 19, which tightly closes the centrifugal chamber of the drum 7 by engaging on the edge of its opening and, together with the base plate 17, can be lifted freely away from the drum 7 by axial outward displacement of the shaft 5 out from the hollow shaft 3. In another embodiment the drum 7 can be axially displaced relative to the then stationary lid 19 for the same purpose.

A feed pipe 21 is arranged at the front end of the reverse filter centrifuge, located to the left of FIG. 1. This feed pipe serves to supply a suspension which is to be separated into its solid and liquid components to the centrifugal chamber of the drum 7. For this purpose, the lid 19 of the drum 7 has a central feed opening 22 through which the free end of the feed pipe 21 enters the inside of the drum, and also when the lid 19 is closed.

As illustrated to the left of FIG. 1, the feed pipe 21 is self-supportingly and rotatably mounted around its longitudinal axis by means of rotary bearings 24 in a stationary bearing block 23 which is securely connected to the housing 1 yet situated outside this housing. By means of a drive motor 25 preferably designed as an electromotor, a belt 26 and a non-rotatable drive pulley 27 arranged on the feed pipe 21, the feed pipe 21 can be caused to rotate around its longitudinal axis which is in alignment with the axis of rotation of the drum 7.

Customary shaft seals 28 seal the outside of the feed pipe 21 in the bearing block 23. The bearing block 23 has a feed opening 29 connectable to a pipe line, through which a suspension to be filtered can be introduced. From the feed opening 29 the suspension is led directly into the feed pipe 21 and from there to the drum 7.

As best seen in the enlarged representation of FIG. 2, a bushing 31, which rotates together with the drum, is rigidly mounted centrally and co-axially to the axis of rotation of the drum in the lid 19 of the drum 7. Near the free end of the feed pipe 21 a ring-shaped closed, elastic membrane 32 is arranged inside a shallow clearance of the pipe end. Via a line 33 extending in the wall of the feed pipe 21, a pneumatic or hydraulic pressure medium can be introduced between the membrane and the outer wall of the feed pipe 21 in the vicinity of the membrane. Under the pressure of the medium, the membrane 32 turns radially outwards and lies right around the inner wall of the bushing 31 such that a completely pressure-resistant seal between feed pipe 21 and lid 19 of the drum 8 results. As seen in FIG. 1, the line 33 opens into an annular recess 34 of the bearing block 23 into which the mentioned pressure medium for the membrane 32 can be introduced via a channel 35.

In FIG. 1, the membrane 32 is illustrated in its turned-out state in which it seals against the bushing 31. FIG. 2 at the top illustrates the same state of the membrane 32. In FIG. 2 at the bottom, the membrane is illustrated in its released pressureless state, in which, due to its elasticity, it is retracted flush into the mentioned clearance at the end of the pipe 21 so that between the sleeve 31 and the membrane 32 a clearance remains all the way round which allows the lid 19 to be freely displaced over the feed pipe 21.

As shown in FIG. 1, a further clearance 36 with outlet channel 37 is provided between the two shaft seals 28 in the bearing block 23. By means of this clearance 36 and this channel 37, suspension which has passed behind the shaft seal 28 situated to the left of FIG. 1, in small amounts during the filling procedure can, in an emergency, be led out into the open.

The feed pipe 21, as illustrated, is penetrated by a pipe line 38 along its whole length, this pipe line being rigidly connected to the bearing block 23, that is, it is kept stationary during rotation of the feed pipe 21. The pipe line 38 in the bearing block 23 can be connected to either a high pressure or a low pressure source so that in the interior of the closed drum 7 an over or underpressure can be produced, against which, as already explained, the seal formed by the bushing 31 and the membrane 32 seals.

Seeing that the feed pipe 21, due to its rotational mounting in the bearing block 23, can be caused to rotate synchronously with the drum 7, no friction results between feed pipe 21 and drum 7 near the feed opening 22. Since the bushing 31 and the membrane 32 also rotate synchronously, no abrasion results which could lead to a contamination of the suspension in the drum 7. Abrasion could, at the most, result to a small extent on the shaft seals 28; it can, however, be flushed out via the recess 36 and the channel 37 without entering the drum 7.

When the drum 7 is opened and the lid 19 is then lifted off the drum and transferred into the position illustrated by the dash-dot lines in FIG. 1, the membrane 32 is brought into its released position, as already mentioned, shown at the bottom of FIG. 2, so that the lid 19 can be freely displaced along the feed pipe 19 without any friction. The free end of the axially fixed feed pipe 21 thereby enters a bore 39 of the shaft 5. (The bore 39 is axially shortened in FIG. 1 due to lack of space).

During operation, the described reverse filter centrifuge first takes up the position illustrated in FIG. 1, in which the membrane 32, acted upon by a pressure medium, produces a seal between lid 19 and feed pipe 21. The displaceable shaft 5 is withdrawn into the hollow shaft 3, whereby the base plate 17 connected to the shaft 5 is located in the vicinity of the base of the centrifugal drum 7 and the filter cloth 15 is turned into the drum such that it lies inside said drum. The centrifugal chamber lid 19 thereby lies sealingly on the edge of the opening of the drum 7. During relatively slow rotation of the drum 7, suspension to be filtered is fed via the feed pipe 21 into the centrifugal chamber of the drum. After completion of the filling process, the drum is caused to rotate relatively fast. The liquid components of the suspension pass through the openings 11 of the drum 7 and are guided out by a baffle plate 40. The solid particles of the suspension are retained by the filter cloth 15 in the form of the usual filter cake.

During the fast drum rotation of the filtration process, an overpressure or underpressure can be generated via the pipe line 38 in the interior of the drum 7, against which the seal formed by the bushing 31 and the membrane 32 seals.

After completion of the filtration process, the shaft 5 is displaced to the left during relatively slow rotation of the drum 7 and after switching off the pressure or underpressure source connected with the line 38 as well as after opening the sealing closure formed by the bushing 31 and the membrane 32 (cf. FIG. 2 at the bottom), whereby the filter cloth 15, as indicated by the dash-dot lines illustrated in FIG. 1, is turned outwards and the solid particles adhering thereto are catapulted outwards into the housing 1. In this opened position of the drum 7, the feed pipe 21 freely penetrates the bore 39 of the shaft 5 past the released membrane 32.

Once the solid particles have been thrown off, the reverse filter centrifuge is returned to its closed operative position as in FIG. 1, by moving the shaft 5 back, the filter cloth 15 hereby being turned back in the opposite direction. In this way, it is possible to operate the centrifuge with a constantly rotating centrifugal drum 7, whereby the pressure ratios in the drum 7 can be regulated as desired. At the same time, there are no rubbing parts present in the region of the feed opening 22 of the lid 19, which could produce an abrasion and thereby contaminate the suspension in the centrifugal chamber of the drum 7.

By means of the motor 25, the belt 26 and the drive pulley 27 the feed pipe 21 can be brought to the same number of rotations as the drum before the sealing closure formed by the bushing 31 and the membrane 32 is closed, so that no undesired abrasion can result even during the closing of this closure, which leads to a non-rotational connection between feed pipe 21 and drum 7.

The illustrated drive of the feed pipe 21 by means of the motor 25 has merely a symbolic character. In practice, the synchronous drive of feed pipe 21 and drum 7 is realized with electrical or mechanical means known per se, for example by using frequency regulated motors with equal set point values.

In the embodiment illustrated and described, the membrane forming an element of the closure of the feed opening 22 is fixed to the feed pipe 21. As an alternative, a membrane acted upon by a pressure medium could also be fixed to the lid 19 of the drum along the inside of the feed opening 22 so that this membrane lies concentrically up against and all around the outer wall of the feed pipe 21 when the pressure medium is applied. In this case, the supply of pressure medium acting on the membrane must take place via the pressure drum 7. This is indicated by the dashed line representing the channel 41 in FIG. 1 which extends as far as the membrane through the shaft 5, the base plate 17, the spacer bolt 18 and the lid 19.

The pipe line 38 serving to generate an over or underpressure on the inside of the feed pipe 21 can be replaced by a pipe line 42 which is formed in the shaft 5 and is also indicated by a dashed line in FIG. 1.

FIG. 3 represents a bearing block 43 of a modified embodiment of an invertible filter centrifuge, whereby the bearing block 43 corresponds with the bearing block 23 in FIG. 1. Parts which are similar to each other in FIGS. 1 and 3 are given the same reference numerals.

As illustrated in FIG. 3, the feed pipe 44 has an end flange 45 on its reverse side. A ring-shaped membrane seal 46 can be sealingly applied to the free end surface of the flange 45 if the rear side of this membrane seal is subjected to a pressure medium via a line 47 formed in the bearing block 43. The membrane seal 46 is for its part also arranged in a corresponding annular clearance 48 of the bearing block 43 which is open towards the end flange 45.

It has been shown that a feed pipe 44 constantly rotating around its longitudinal axis together with the drum 7 can be impracticable if the solid particles of especially sensitive suspensions can already be deposited on the wall of the rotating feed pipe 44 during the filling of the suspension into the drum 7. In such cases, it is advantageous to keep the feed pipe 44 stationary during the filling process, which is without a doubt possible with a further rotating drum 7 if the seal formed by the bushing 31 and the membrane 32 is opened in the aforementioned way. When the feed pipe 44 is stationary, the elastic membrane seal 46 can, however, easily be brought into engagement on the end flange 45. In this way, the filled-in suspension is reliably prevented from reaching the area of the shaft seal 28. When the seal formed by the bushing 31 and the membrane 32 is closed during the filtration process and the feed pipe 44 rotates together with the drum 7, the membrane seal 46 is in an open state, that is, detached from the end flange 45 of the feed pipe, so that no undesirable abrasion can occur between membrane seal 46 and feed pipe 44.

In the described embodiments of reverse filter centrifuges, the seals (bushing 31, membrane 32; seal 46) are designed as membrane seals. It is obvious that such membrane seals can also be replaced by other closure elements in the form of pneumatically or hydraulically operatable elastic squeezable seals, for example, also in tubular form.

I claim:

1. An invertible filter centrifuge comprising a self-supporting drum (7) rotatably mounted in a housing (1), said drum having radial filtrate passages (11) and being capable of receiving an overpressure or underpressure, a lid (19) closing a free end face of the drum, said drum and lid being axially movable relative to one another, a feed opening (22) for suspension to be filtered arranged in the lid and a feed pipe (21) sealingly inserted through the feed opening, the improvement comprising that the feed pipe (21) is rotatably mounted around its longitudinal axis and is rotatable together with the drum (7) around this axis.

2. An invertible filter centrifuge according to claim 1, the improvement comprising that the feed pipe (21) is drivable for rotation essentially synchronously with the drum (7) by means of a drive means (25, 26, 27).

3. An invertible filter centrifuge according to claim 1, the improvement comprising that a closure element (32) optionally controllable to move back and forth between an open and closed position is arranged to achieve the seal between the feed opening (22) and the feed pipe (21).

4. An invertible filter centrifuge according to claim 3, the improvement comprising that the closure element (32) is connected to the feed pipe (21).

5. An invertible filter centrifuge according to claim 3, the improvement comprising that the closure element is a pneumatically or hydraulically operatable elastic squeezable seal.

6. An invertible filter centrifuge according to claim 5, the improvement comprising that the squeezable seal is designed as an annular membrane (32).

7. An invertible filter centrifuge according to claim 1, the improvement comprising that the feed pipe (21) is rotatably mounted in a bearing block (23) arranged at a distance from the feed opening (22) outside the drum (7).

8. An invertible filter centrifuge according to claim 7, the improvement comprising that a drainage channel (37) is provided in the bearing block (23) for leaking suspension.

9. An invertible filter centrifuge according to claim 7, the improvement comprising that a sealing element (46) optionally controllable to move back and forth between an open and closed position is arranged between feed pipe (44) and bearing block (43), said element sealing the feed pipe (44) against the bearing block (43) when the feed pipe is not rotating.

10. An invertible filter centrifuge according to claim 9, the improvement comprising that an elastic membrane seal (46) is arranged as controllable sealing element between the front side (45) of the feed pipe (44) remote from the feed opening and the bearing block (43).

* * * * *